United States Patent [19]

Weiss et al.

[11] Patent Number: 5,522,604
[45] Date of Patent: Jun. 4, 1996

[54] METALLIC FLAT GASKET

[75] Inventors: Alfred Weiss, Neu-Ulm; Franz Hieble, Senden/Aufheim; Hans Katzmaier, Beimerstetten; Günter Unseld, Neenstetten, all of Germany

[73] Assignee: Reinz-Dichtungs-Gesellschaft mbH, Germany

[21] Appl. No.: 77,410

[22] Filed: Jun. 16, 1993

[30] Foreign Application Priority Data

Jun. 16, 1992 [DE] Germany ............................ 42 19 709.0

[51] Int. Cl.$^6$ ...................................................... F16J 15/08
[52] U.S. Cl. ............................................ 277/180; 277/235 B
[58] Field of Search ............................. 277/180, 235 B, 277/236, 234, 232, 233

[56] References Cited

U.S. PATENT DOCUMENTS

| 4,531,750 | 7/1985 | Herrington | 277/234 X |
| 4,781,389 | 11/1988 | Beyer et al. | 277/235 B |
| 4,836,562 | 6/1989 | Yoshino | 277/235 B |
| 5,092,613 | 3/1992 | Udagawa | 277/235 B |
| 5,205,566 | 4/1993 | Ueta et al. | 277/235 B X |
| 5,286,039 | 2/1994 | Kawaguchi et al. | 277/180 |
| 5,391,333 | 2/1995 | Stecher et al. | 264/40.1 |

FOREIGN PATENT DOCUMENTS

| 0230804 | 11/1986 | European Pat. Off. | |
| 0473306 | 8/1991 | European Pat. Off. | |
| 0485693 | 5/1992 | European Pat. Off. | 277/235 B |
| 3835611 | 5/1990 | Germany . | |
| 62-181756 | 11/1987 | Japan | 277/235 B |
| 63-112261 | 7/1988 | Japan | 277/235 B |
| 63-246571 | 10/1988 | Japan . | |
| 1079471 | 3/1989 | Japan | 277/235 B |
| 4015372 | 1/1992 | Japan | 277/235 B |
| 5052267 | 3/1993 | Japan | 277/235 B |

Primary Examiner—William A. Cuchlinski, Jr.
Assistant Examiner—John L. Beres
Attorney, Agent, or Firm—Sixbey, Friedman, Leedom & Ferguson; David S. Safran

[57] ABSTRACT

A metallic flat gasket, particularly a cylinder head gasket having at least one beaded gasket plate and a support plate surrounds at least one passage opening. On the edge of the gasket plate surrounding the passage opening is shaped a bead, which is held in indirect force closure. To this end the area of the carrier sheet supporting the free leg of the bead is thinner or thicker than the remaining area. It preferably has a topographically freely selected shape and/or different widths along the passage opening circumference. A material reinforcement is obtained in that the carrier sheet is provided with a recess and a metal ring e.g. formed by a fold or flange.

4 Claims, 3 Drawing Sheets

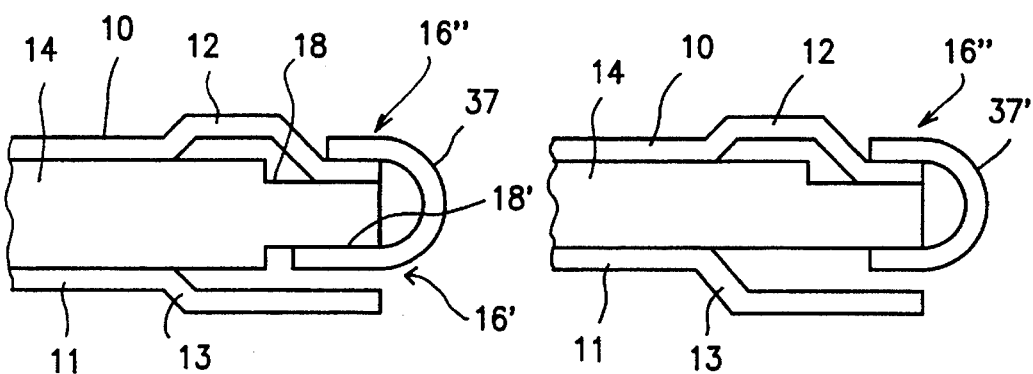
FIG. 17   FIG. 18
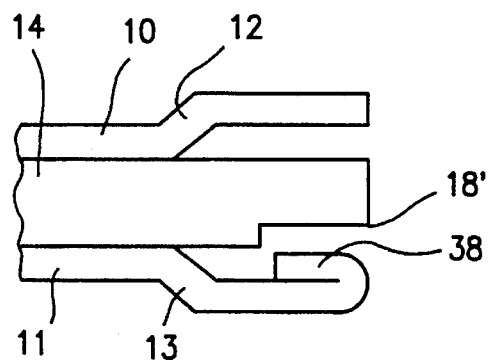
FIG. 19
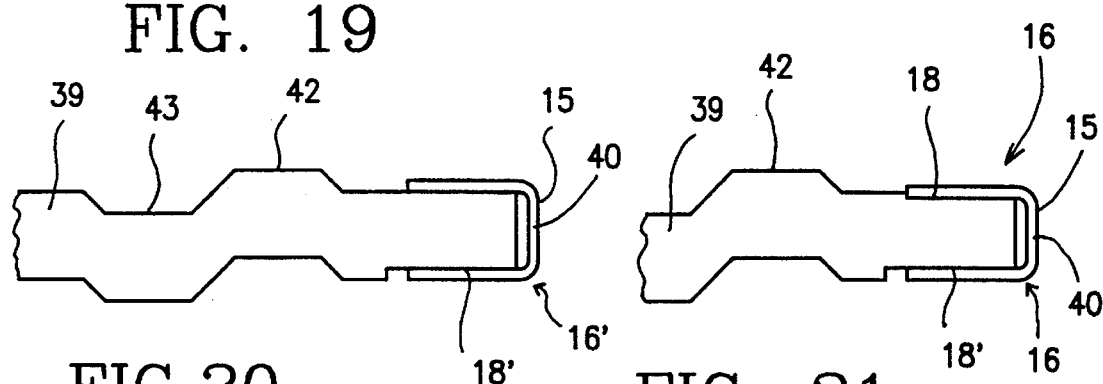
FIG. 20   FIG. 21
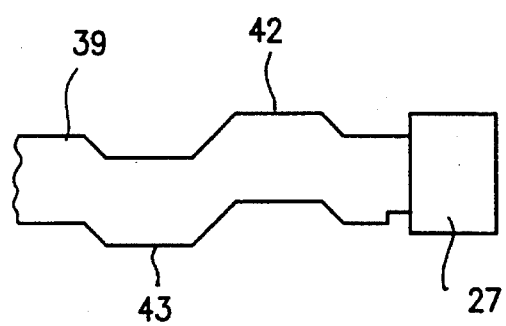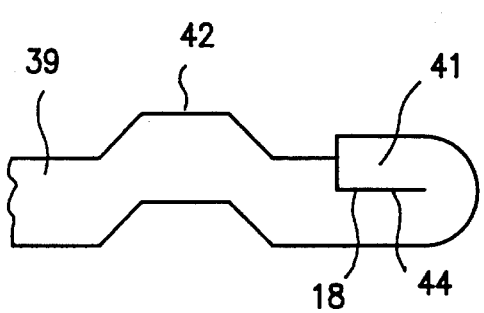
FIG. 22   FIG. 23

METALLIC FLAT GASKET

BACKGROUND OF THE INVENTION

The invention relates to a metallic flat gasket, particularly a cylinder head gasket, with a substantially flat gasket body having at least one beaded gasket plate, especially a cylinder head gasket having parallel sealing surfaces which surround at least one opening.

As the sealing gap between the head and the cylinder block of an internal combustion engine oscillates as a result of internal pressure and temperature fluctuations and consequently a sealing or gasket embodiment is subject to constant pressure changes, the gasket must have very good and durably resilience characteristics. As a result of the shaping of the beads an adequate elasticity is to be achieved, so as to ensure a permanent sealing of the different operating media.

To ensure the necessary elasticity on a long term basis, neither in the fitted state of the gasket, nor in the operating state with the various dynamic loads, must the beads be pressed completely flat.

It is known from the Applicant's German Published Application 38 35 611 to construct the bead with a smaller thickness than the gasket body and to taper it from said gasket body to its free edge. In the relieved state the bead projects with at least one convex bulge over the space defined by the two sealing surfaces.

It is also known to insert a thin metal sheet as an intermediate layer below the gasket plate and to fold it round in the vicinity of the beads. This leads to a projection level with the sheet metal thickness, which prevents the bead from being flattened. However, it is disadvantageous that the projection is of the same height as a result of the system in the case of all holes to be sealed, so that a desired, planned surface pressure matching is excluded, this being the prerequisite for sealing under differing constructional conditions. However, if an attempt was made to use different sheet metal thicknesses within a gasket body, this would prove uneconomic.

SUMMARY OF THE INVENTION

The object of the invention is to provide a flat gasket of the aforementioned type, which prevents the flattening of the beads and simultaneously ensures a reliable, economic sealing under different constructional conditions.

The invention has the advantage that on a single passage or on different passages of the same gasket varyingly high projections are produced for the supporting of the bead and therefore in a planned manner different surface pressures can be set and are maintained unchanged over the entire period of use of the gasket. The invention creates the prerequisite for a high flexibility with regards to the design and precision matching of the bead support and as a consequence thereof the surface pressure distribution over the entire gasket.

According to a preferred development of the invention, the first area supporting the free leg has a topographically freely selected shape and/or variable width along the circumference of the passage opening or over the length of the side.

The invention is described in greater detail hereinafter relative to the embodiments shown in the drawings.

DESCRIPTION OF THE DRAWINGS

FIGS. 1 to 23 diagrammatically show a crosssection through one edge of an opening of a flat metallic gasket in accordance with various embodiments and modifications thereto.

DESCRIPTION OF THE PREFERRED EMBODIMENTS

Figure 1:
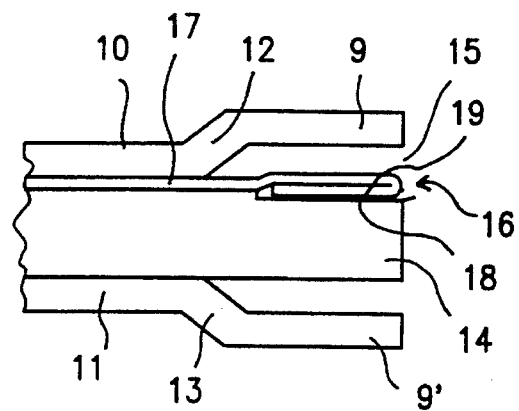

Throughout the following description identical parts are always given the same reference numerals. The description of these parts with respect to a specific drawing consequently also applies to all the other relevant drawings, even if no separate description is provided.

FIG. 1 shows a crosssection through a cylinder head gasket in the vicinity of a passage opening edge 15. The cylinder head gasket comprises a head-side, beaded gasket plate 10, which in the fitted state faces a not shown cylinder head, a block-side gasket plate 11, which in the fitted state faces a not shown engine block, as well as two sheet metal layers, comprising a carrier sheet 14 and an intermediate sheet 17, which is thin compared with the carrier sheet 14 and positioned between the latter and the head-side gasket plate 10.

The two gasket plates 10, 11 are, in each case, provided with a bead 12, 13, whose free legs 9, 9' are spaced from the carrier sheet 14 or intermediate sheet 17 in the relieved position. Below the free leg 9 of the head-side bead 12 there is a material reinforcement 16, with which the bead 12 is placed under indirect force closure. If it is subject to the various dynamic loads in the fitted state or in the operating state, the material reinforcement 16 prevents the bead 12 from becoming completely flattened.

In the embodiment according to FIG. 1, the material reinforcement is obtained in that, on the one hand, there is a ring-like recess 18 in the carrier sheet 14, and on the other, on the intermediate sheet 17 is placed a raised lining of constant thickness in the form of a fold 19, which comes to rest in the vicinity of the recess 18. Through the choice of the depth of the recess 18, any desired effective material reinforcement 16 can be obtained, the latter term being understood to mean the level difference between the tops of the fold 19 and the unreinforced intermediate sheet 17. The depth of the reinforcement 18 can differ over its circumference along the opening edge, so that, in a planned manner, a different surface pressure and consequently an optimum surface pressure distribution is set, which takes account of the constructional circumstances, e.g. of a cylinder head gasket.

Figure 2:
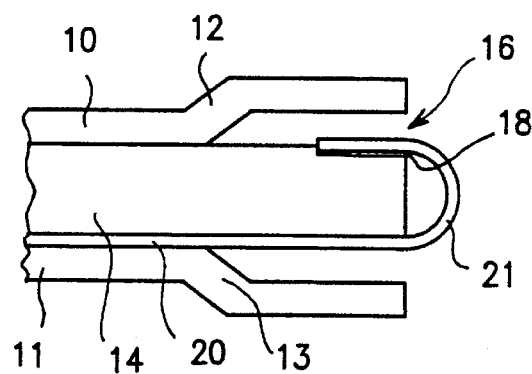

According to FIG. 2 the material reinforcement 16 is obtained in that another intermediate sheet 20 is positioned between the carrier sheet 14 and the blockside gasket plate 11 and is bent with a flange 21 around the carrier sheet 14 in such a way that said flange 21 comes to rest in the recess 18, accompanied by the formation of a raised lining or fold. In the present embodiment, the height of the material reinforcement 16 results from the difference of the sheet metal thickness of the intermediate sheet 20 and the depth of the recess 18.

Figure 3:
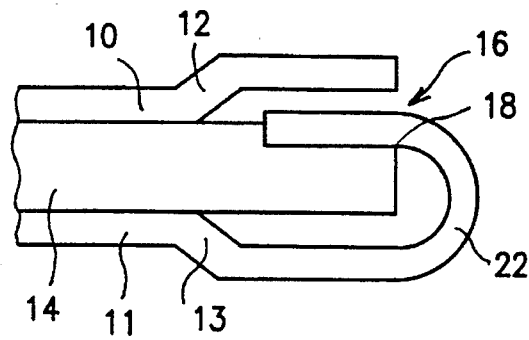

FIG. 3 illustrates an embodiment, in which the material reinforcement 16 is produced by a flange 22 of the block-side gasket plate 11, the free leg of the flange 22 being located in the recess 18.

Figure 4:
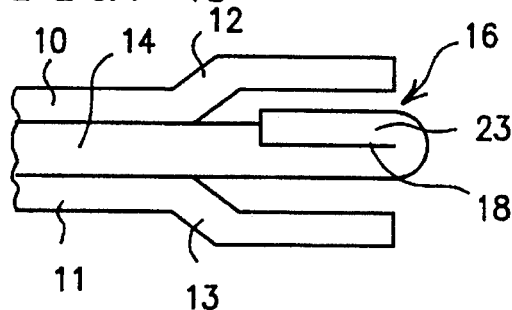

According to FIG. 4 the carrier sheet 14 is provided at its free end with a fold 23, the thickness of the carrier sheet 14 in the vicinity of the fold 23 being smaller than in the remaining area and the material reinforcement 16 results from the doubling of the sheet metal cross-section.

Figure 5:
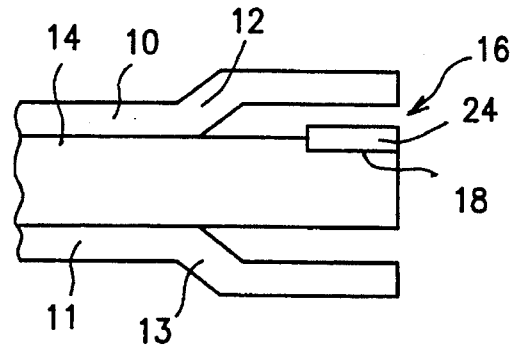
Figure 6:
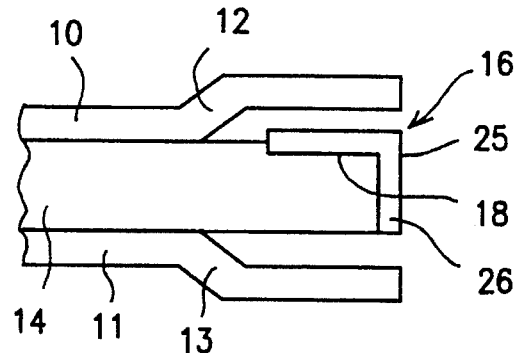
Figure 8:
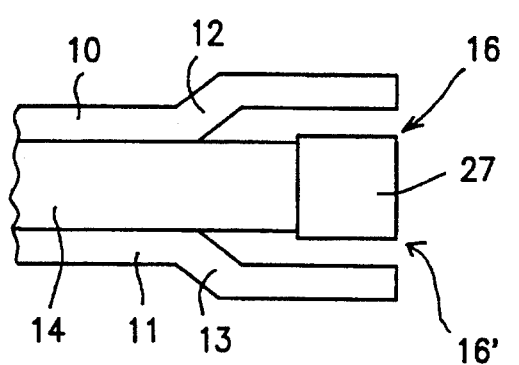

The material reinforcement 16 according to FIG. 5 is obtained through a sheet metal insert, e.g. a metal ring 24, which is located in the preimpressed recess 18. In the embodiment according to FIG. 6 a ring 25 is provided with a collar 26, which covers the end face of the carrier sheet 14.

Figure 7:
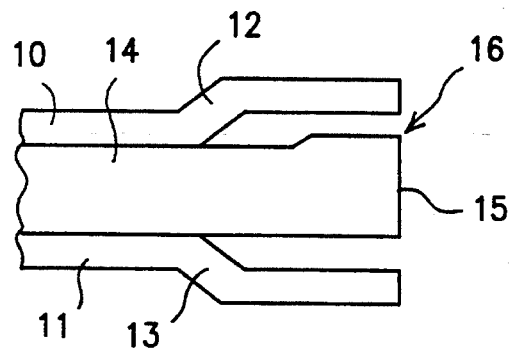

FIG. 7 shows as a further alternative for producing the material reinforcement 16 the upsetting or squeezing of the carrier sheet 14 from the opening edge 15.

The above embodiments are described in conjunction with a head-side material reinforcement. It is equally possible to construct these asymmetrical arrangements in such a way that the material reinforcement is on the block side.

The following FIGS. 8 to 12 illustrate variants, in which both the block side and the head side bead 12, 13 are in indirect force closure, i.e. both the material reinforcement 16 in the direction of the head-side gasket plate 10 and also a material reinforcement 16' in the direction of the block-side gasket plate 11 are present and can differ. According to FIG. 8 these two reinforcements 16, 16' are produced with a ring 27, whose projecting lengths extend beyond the top and bottom of the carrier sheet 14 for producing the desired indirect force closures. The projecting lengths can be made of different sizes and/or topographically, which also applies for all the following asymmetrical examples.

Figure 9:
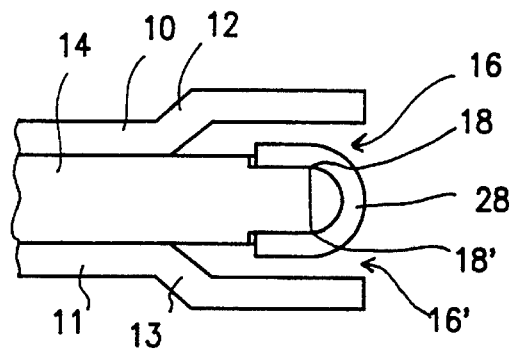

In FIG. 9, the carrier sheet 14 is provided with two recesses 18, 18', in which are located the legs of a U-head 28 passed round the end face of the carrier sheet 14.

Figure 10:
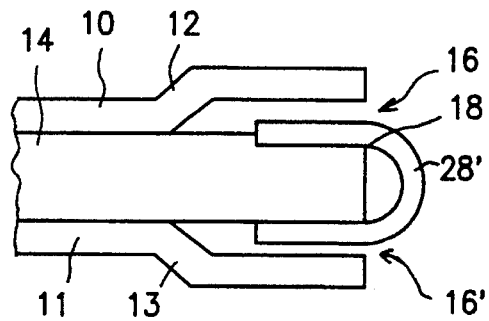

In FIG. 10, a U-flange 28' is located on the opening edge, whose head-side leg is located in the recess 18, and whose block-side leg is located on the block-side surface of the carrier sheet 14 not provided with a recess.

Figure 11:
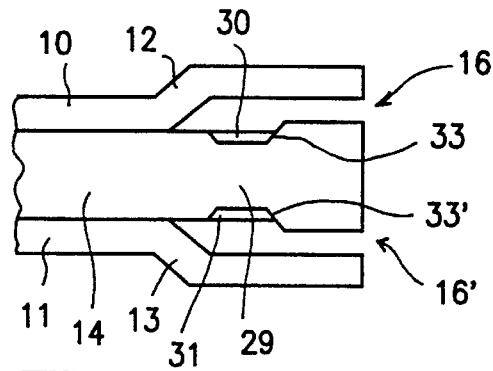
Figure 12:
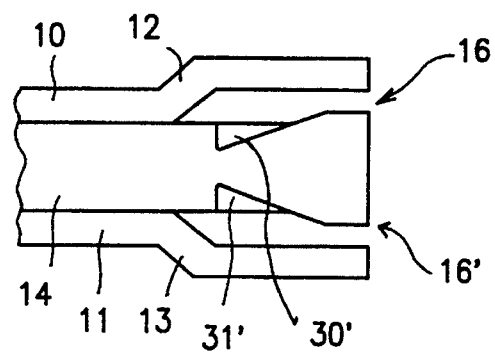

According to FIGS. 11 and 12, the head and block-side material reinforcements 16, 16' are produced by the extrusion of the carrier sheet 14. Accompanied by the formation of a cross-sectional constriction 29 by head and block-side impressions 31, 31, in a planned manner the desired material reinforcements 16, 16' are obtained on the combustion chamber edge 15. The impressions 30, 31 are freely selectable as regards shape and depth, so that the resulting material reinforcements 16, 16' can be produced in a planned manner. For example, the impressions 31, 31 in FIG. 11 are trapezoidal with relatively steep edges 33, 33' to the material reinforcements 16, 16'.

In FIG. 12, the impressions 30', 31' are triangular with a shallow rise to the material reinforcements 16, 16'.

In the embodiments of a flat gasket described relative to FIGS. 13 to 19, an indirect force closure of the head-side bead 12 or the block-side bead 13 (FIG. 19) is achieved in that the free leg of the beaded gasket plate 10 is placed in the recess 18, 18'. This measure can be combined with the abovedescribed measures, such as are e.g. shown in FIGS. 17 and 18.

Figure 13:
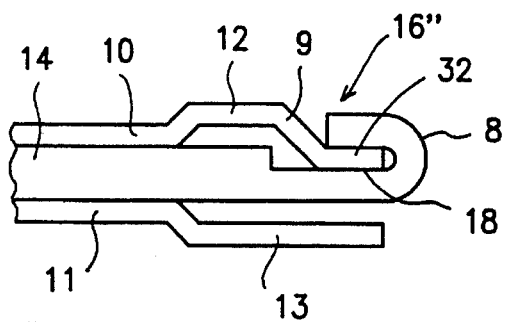

According to FIG. 13, a cross-sectionally reduced carrier sheet 14, which is optionally topographically preshaped accompanied by the formation of the recess 18, is flanged round the base 32 of the free leg 9 of the head-side bead 12. Therefore, the free leg 9 is more deeply supported than the other leg and it is also held in its base 32 by the flange 8. The material reinforcement 16", which prevents a flattening of the bead 12, is determined by the height difference of the surfaces of the gasket plate 10 and the flange 8.

Figure 14:
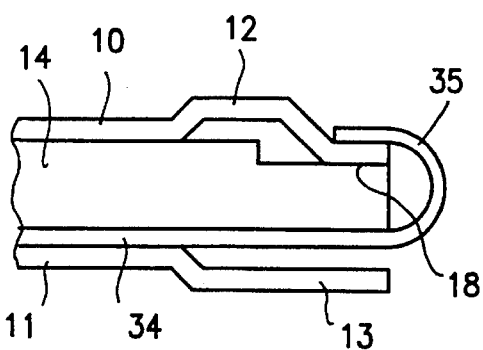

In the embodiment according to FIG. 14, there is an intermediate sheet 34 between the carrier sheet 14 and the block-side gasket plate 11. A flanged round edge 35 of the intermediate sheet 34 maintains the free base of the head-side bead 12 in the recess 18.

Figure 15:
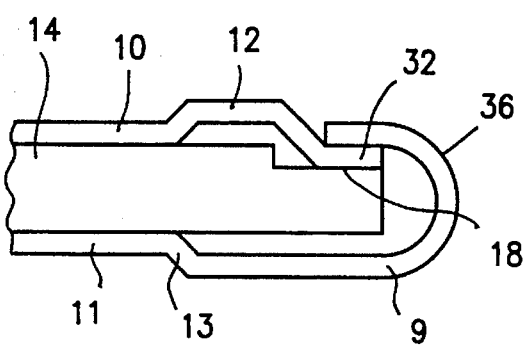

In the variant according to FIG. 15, an extension 36 of the free leg 9 of the block-side bead 13 is flanged round the carrier sheet 14 and the base 32 of the head-side bead 12.

Figure 16:
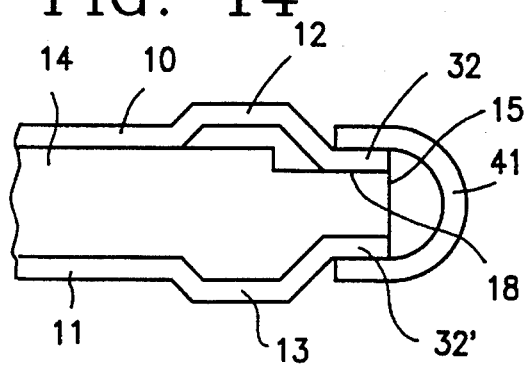

According to FIG. 16, in this embodiment an equal-sided U-flange 41 is applied to the free bases of the head and block-side beads 12, 13 from the opening edge 15, the head-side base 32 being located in the recess 18 and the block-side base 32' on the planar, block-side surface of the carrier sheet 14. In another variant shown in FIG. 17, on the head and block side of the carrier sheet 14 are provided recesses 18, 18'. The free base of the head-side bead 12 is supported in the head-side recess 18. In the block-side recess 18' there is a leg of a U-flange 37 which, due to its material thickness, projects from the block-side recess 18' and consequently, accompanied by the formation of a material reinforcement 16', places the free leg of the block-side bead 13 in indirect force closure. The other leg of the flange 37, as in the preceding embodiments, secures the base 32 of the head-side bead 12 and forms the desired raised lining or fold.

The embodiment according to FIG. 18 differs from that of FIG. 17 in that the block-side leg of the flange 37' comes to rest on the block side of the carrier sheet 14 and there is no recess on the latter.

FIG. 19 shows an embodiment with a block-side recess 18'. The associated free leg of the block-side bead 13 is folded round in such a way that the fold 38 in the unloaded state is at a predetermined distance from the recess 18' and in the loaded state is located in the recess 18'.

To the extent that the above embodiments according to FIGS. 8 to 19 are asymmetrical with respect to the head and block sides, the statements made with respect to the latter can, if required, be interchanged.

In the case of the gasket shown in FIGS. 20 and 21, there is a single gasket plate 39 with beads 42, 43, which has an impressed recess 18, 18'. It cooperates with a U-flange 40, which is fitted to the sheet metal edge (FIGS. 20/21) and in this way produces the desired material reinforcements 16, 16' along the opening edge 15.

Alternatively, according to FIG. 22, a ring 27 with a greater thickness than the gasket plate 39 is frontally used on the gasket.

In the one-piece variant according to FIG. 23, the free end of the plate 39 is firstly thinned by a preimpression 44 and placed round, accompanied by the formation of a fold 41.

For all the above-described embodiments, the recesses 18 and the material reinforcements 16, 16' obtained can have a topographically freely selected shape and different widths, the height of the desired projections being determined by the amount of the preimpressions or recesses. It is therefore very easily possible to obtain different material reinforcements 16, 16' within the same gasket.

The individual sheet metal layers within a gasket can be made from the same or different materials, preferably structural steel, galvanized structural steel, aluminium-plated structural steel, spring steel, heat-resistant steel, high-grade steel, heat-treated steel, cast steel, copper or aluminium and can have thicknesses of 0.05 to 2.5 mm. Moreover, for microsealing purposes, they can be coated on one or both sides with rubber, preferably NBR, FPM, ACM, MVQ or PU in a thickness of 5 to 10 µm, preferably 20 to 50 µm.

It is finally to be understood that although preferred embodiments of the present invention have been described, various other embodiments and variations may occur to those skilled in the art which fall within the scope and spirit of the invention, and such other embodiments and variations are intended to be covered by the following claims.

What we claim is:

1. A metallic flat gasket comprising a gasket body having a pair of parallel sealing faces which surround at least one opening; wherein said gasket body has at least one bead; wherein a material reinforcement is provided between said at least one bead and said at least one opening, said material reinforcement constituting a means for producing a predetermined surface pressure on said bead which, in use, prevents the bead from being completely flattened, said material reinforcement comprising an area of the gasket body that has been modified to have a thickness which differs from that of remaining areas thereof; wherein said gasket body comprises at least one gasket plate and a carrier sheet; wherein said at least one gasket plate has a bead with a free leg; wherein the carrier sheet forms at least part of said material reinforcement, for which purpose the carrier sheet has a modified area of a thickness which differs from that of remaining areas thereof and which is located under said free leg of the bead; and wherein the material reinforcement, as a whole, has a thickness at said modified area which is greater than that of said remaining areas of the carrier sheet; wherein said modified area of the carrier sheet is thinner than the remaining areas due to the presence of a recess at at least one side thereof at an edge of the gasket body which defines the at least one opening; and wherein said material reinforcement further comprises a raised lining formed of a U-shaped part located on the thinner modified area of the carrier sheet, being fitted into the at least one recess and extending around said edge of the gasket body which defines the at least one opening; and wherein said portion of the raised lining has a thickness which, when added to that of said modified area, is greater than that of said remaining areas of the carrier sheet; wherein said gasket is a cylinder head gasket; wherein said at least one beaded gasket plate comprises a head-side gasket plate with a bead and a block-side gasket plate with a bead; and wherein said recess is provided on each of opposite sides of the carrier sheet.

2. A metallic flat gasket according to claim 1, wherein the gasket body is formed of metal sheets made of different materials.

3. A metallic flat gasket comprising a gasket body having a pair of parallel sealing faces which surround at least one opening; wherein said gasket body has at least one bead; wherein a material reinforcement is provided between said at least one bead and said at least one opening, said material reinforcement constituting a means for producing a predetermined surface pressure on said bead which, in use, prevents the bead from being completely flattened, said material reinforcement comprising an area of the gasket body that has been modified to have a thickness which differs from that of remaining areas thereof; wherein said gasket body comprises at least one gasket plate and a carrier sheet; wherein said at least one gasket plate has a bead with a free leg; wherein the carrier sheet forms at least part of said material reinforcement, for which purpose the carrier sheet has a modified area of a thickness which differs from that of remaining areas thereof and which is located under said free leg of the bead; and wherein the material reinforcement, as a whole, has a thickness at said modified area which is greater than that of said remaining areas of the carrier sheet; wherein said modified area of the carrier sheet is thinner than the remaining areas due to the presence of a recess at at least one side thereof at an edge of the gasket body which defines the at least one opening; and wherein said material reinforcement further comprises a raised lining formed of a U-shaped part located on the thinner modified area of the carrier sheet, being fitted into the at least one recess and extending around said edge of the gasket body which defines the at least one opening; and wherein said portion of the raised lining has a thickness which, when added to that of said modified area, is greater than that of said remaining areas of the carrier sheet; wherein a said recess is provided at both sides of the carrier sheet; and wherein said raised lining has a constant thickness, at least a portion of which is located each recess.

4. A metalllic flat gasket according to claim 3, wherein the gasket body is formed of metal sheets made of different materials.

* * * * *